United States Patent
Hemmings et al.

(10) Patent No.: US 7,070,131 B2
(45) Date of Patent: Jul. 4, 2006

(54) WHITE POZZOLAN COMPOSITION AND BLENDED CEMENTS CONTAINING SAME

(75) Inventors: Raymond T. Hemmings, Kennesaw, GA (US); Robert D. Nelson, Stone Mountain, GA (US); Philip L. Graves, Peoria, IL (US); Bruce J. Cornelius, Waterdown (CA)

(73) Assignee: Albacem LLC, Peoria, IL (US)

( * ) Notice: Subject to any disclaimer, the term of this patent is extended or adjusted under 35 U.S.C. 154(b) by 0 days.

(21) Appl. No.: 10/873,470

(22) Filed: Jun. 21, 2004

(65) Prior Publication Data

US 2004/0250736 A1 Dec. 16, 2004

Related U.S. Application Data

(62) Division of application No. 10/087,064, filed on Mar. 1, 2002, now Pat. No. 6,776,838.

(60) Provisional application No. 60/329,921, filed on Oct. 17, 2001, provisional application No. 60/273,176, filed on Mar. 2, 2001.

(51) Int. Cl.
*B02C 19/12* (2006.01)

(52) U.S. Cl. .......................................... 241/19; 241/29
(58) Field of Classification Search ............... 106/716; 65/21.1, 215, 482; 241/29, 24.22, 24.29, 241/24.3, 24.19, 19, 24.15
See application file for complete search history.

(56) References Cited

U.S. PATENT DOCUMENTS

| 6,029,477 A * | 2/2000 | Hanvey, Jr. .................. 65/483 |
| 6,199,778 B1 * | 3/2001 | Hanvey, Jr. .................. 241/19 |

* cited by examiner

*Primary Examiner*—Mark Rosenbaum
(74) *Attorney, Agent, or Firm*—Klauber & Jackson

(57) ABSTRACT

A white pozzolan derived from by-products of manufacturing vitreous low alkali, low iron glass fibers, and to the method for producing the white pozzolan. The invention relates as well to cement compositions based on the white pozzolan, such as white and pigmented blended pozzolanic cements of high durability for use in applications such as white or colored architectural concrete, building materials, and manufactured cementitious products. The white pozzolan also functions as a high performance pozzolan with grey cement.

6 Claims, 2 Drawing Sheets

WHITE POZZOLAN COMPOSITION AND BLENDED CEMENTS CONTAINING SAME

CROSS REFERENCE TO RELATED APPLICATIONS

The present application is a Division of U.S. application Ser. No. 10/087,064 filed Mar. 1, 2002, now U.S. Pat. No. 6,776,838 which in turn, claims priority from U.S. Provisional Applications Ser. Nos. 60/273,176 filed Mar. 2, 2001 and 60/329,921 filed Oct. 17, 2001. Applicants claim the priority under 35 U.S.C. § 119 as to the said United States applications, and the entire disclosures of the Ser. No. 10/087,064 application is incorporated herein by reference in its entirety.

FIELD OF THE INVENTION

The present invention relates generally to pozzolanic cements, and more specifically relates to a white pozzolan derived from glass manufacturing by-products, and to the method for producing the white pozzolan. The invention relates as well to cement compositions based on the white pozzolan, such as white and pigmented blended pozzolanic cements of high durability for use in applications such as white or colored architectural concrete, building materials, and manufactured cementitious products. Although the white color of the pozzolan and its consequent use with white cement can generate great added value, the white pozzolan also functions as a high performance pozzolan with grey cement.

DEFINITIONS

As used herein the following definitions shall apply, which are adopted from ASTM C-618: Standard Specification for Coal Fly Ash and Raw or Calcined Natural Pozzolan for Use as a Mineral Admixture in Concrete:

"Pozzolan—A siliceous or siliceous and aluminous material which in itself possesses little or no cementitious value but will, in finely divided form and in the presence of moisture, chemically react with calcium hydroxide at ordinary temperatures to form compounds possessing cementitious properties.

Class N Pozzolan—Raw or calcined natural pozzolans that comply with the applicable requirements for the class as given herein, such as some diatomaceous earths; opaline cherts and shales; tuffs and volcanic ashes or pumicites, calcined or uncalcined; and various materials requiring calcination to induce satisfactory properties, such as some clays and shales.

Class F Fly Ash—Fly ash normally produced from burning anthracite or bituminous coal that meets the applicable requirements for this class as given herein. This class fly ash has pozzolanic properties.

Class C Fly Ash—Fly ash normally produced from lignite or subbituminous coal that meets the applicable requirements for this class as given herein. This class fly ash, in addition to having pozzolanic properties, also has some cementitious properties."

BACKGROUND OF THE INVENTION

In a representative glass fiber manufacturing facility, typically 10–20 wt % of the processed glass material is not converted to final product and is rejected as industrial by-product or waste and sent for disposal to a landfill. This rejected material represents a substantial cost to the industry and also generates a consequent detrimental impact on the environment. While the rejected by-product referred to may have widely varying physical form, ranging from thick fiber bundles to partially fused fiber agglomerates and shot, it is evident from chemical analyses of various samples recovered at different times, that the material still has a substantially constant chemical and mineralogical make-up. Thus, unlike wastes from many other industrial processes which typically have widely varying chemical and mineralogical properties, the waste from the glass fiber manufacturing process is very consistent in composition and still benefits from the stringent engineering quality control applied to the glass-making process itself. This consistency is a major advantage to any potential utilization of the glass fiber manufacturing waste.

More specifically, the glass formulations of great relevance to this invention are those of low alkali calcia-alumina-silica compositions ($CaO$—$Al_2O_3$—$SiO_2$ or "CAS") typically used for commercial glass fiber manufactured to comply with ASTM D-578. These formulations are given in Table 1. The compositions are vitreous and by virtue of their components have very low levels of discolorants. These compositions are expressed conventionally in terms of the element oxide and are not meant to imply that the oxides, crystalline or otherwise, are present as distinct compounds in the amorphous glasses.

TABLE 1

| Component (Element Oxide) | Composition Range (% by Weight) |
|---|---|
| Silicon dioxide, $SiO_2$ | 52–62 |
| Aluminum oxide, $Al_2O_3$ | 12–16 |
| Iron oxide, $Fe_2O_3$ | 0.05–0.8 |
| Calcium oxide, $CaO$ | 16–25 |
| Magnesium oxide, $MgO$ | 0–5 |
| Sodium oxide + potassium oxide ($Na_2O + K_2O$) | 0–2 |
| Boron oxide, $B_2O_3$ | 0–10 |
| Titanium dioxide, $TiO_2$ | 0–1.5 |
| Fluorine, $F_2$ | 0–1 |
| Mineralogical Composition (XRD) | Amorphous (glassy) |

Several features are immediately evident from inspection of the data in Table 1. First, the general chemical and mineralogical composition of the glass fiber material is very similar to amorphous (glassy) calcium alumino-silicate materials, such as blast-furnace slag and Class C fly ash, that are commonly used as cementitious or pozzolanic admixtures in portland cement concrete; second, the alkali ($Na_2O+K_2O$) content of the glass is very low (0 to 2%); and third, with their inherently low iron contents (0.05 to 0.8%), the glasses have little or no color. Low alkali content and chemical consistency differentiates the glass fiber manufacturing waste from post consumer waste glass, for example container bottles and flat glass, that have widely varying chemical composition, generally high alkali content, and in the case of container/bottle glass are highly colored.

Conventionally, white portland cement is used in a variety of applications, including but not limited to: white or light colored architectural concrete; precast concrete panels; cast stone monuments and statuary; ornamental landscaping; decorative flooring tiles and terrazzo; wall cladding, stuccos and plasters; tile grout; caulk and white cement paint.

White portland cement by itself does not have good durability, particularly under service conditions where it is exposed to attack by sulfate solutions and other aggressive chemicals. This is because the chemical composition of white cement is different from gray Portland cement in order to obtain the desirable white color. The main difference is that white cement has a very low iron content which during the manufacturing process leads to the formation of much higher tricalcium aluminate $C_3A$ content in the finish clinker. Typically during cement manufacturing, $C_3A$ reacts with iron oxide to form tetracalcium aluminoferite ($C_4AF$). The lack of iron oxide in white cement results in high levels of tricalcium aluminate that are the reason for the well known susceptibility of white cement to chemical deterioration when exposed to an environment that is rich in sulfate. Such an environment can be found in many soils and in seawater. A high $C_3A$ content can also contribute to the increase in volume changes that can result in the formation of cracks in hardened concrete.

Cementitious and pozzolanic admixtures used with portland cement, such as blast-furnace slag, fly ash, silica fume and metakaolin, are characteristically fine particulate powder materials that are comparable in fineness to portland cement. In addition to improving the economics of production through cement replacement, these "supplementary cementing materials" are also well known to improve the long term durability of cement and concrete products, for example by reducing deterioration due to attack by aggressive chemical media, such as sulfate, and expansion due to reactions between the aggregates and the cement alkalis (so-called "alkali-aggregate reaction" or AAR).

These pozzolans, however, have chemical components that inevitably impart an undesirable dark color to white cement that negates the reason for using the material. For this reason, use of the architecturally desirable white cement has been somewhat limited to applications where there is no likelihood of exposure to sulfate and other aggressive chemicals. This is unfortunate because major markets for white and light colored concrete and concrete products exist in the coastal regions where exposure to high sulfate containing soils and seawater spray are likely.

Another additive that has been used in white cement is metakaolin. See for example U.S. Pat. Nos. 6,007,620, and 6,033,468, disclosing an interground white blended cement based on metakaolin. Metakaolin however, aside from its relatively high costs, differs from the pozzolan of this invention, in typically imparting a cream to pinkish tone to white cement and in having very high water demand, rendering it of limited commercial value in the area of present interest.

SUMMARY OF INVENTION

Now in accordance with the present invention the inventors have found that once it is ground to a powder of suitable fineness, the glass fiber waste discussed above can effectively function as a reactive pozzolanic admixture for use in portland cement-based building materials and products, such as concrete, mortars and grouts.

The inventors have also found that, unlike other cementitious and pozzolanic admixtures, such as blast-furnace slag, fly ash and silica fume which are characteristically dark in color, the finely ground glass pozzolan (which retains the vitreous nature and chemical composition of the fiber feed) is white in color. This white color makes the glass pozzolan highly desirable as a pozzolanic admixture for use with white portland cement, an application that is not suitable for the dark colored pozzolans.

According to a process aspect of this invention, glass fiber wastes are converted into high quality filler and pozzolan products, by shredding long entangled strands of glass into short fibers, adjusting the moisture content of the short fibers, grinding the short fiber, and classifying the ground material to produce a uniform high quality product with precise control over the maximum particle size and particle size distribution. Because of its physical characteristics, this product will at times herein be referred to as "white VCAS pozzolan", the "VCAS" being a reference to its production from fibers of "vitreous calcium—alumino-silicate" glass. The white VCAS pozzolan has a reflectance value of at least 80 as measured by a Technibrite TB-1C colorimeter according to the ISO 2467, 2471 method.

Several options are available for use of the white VCAS pozzolan of the invention in the cement and concrete industry: (a) it can be added as a separate pozzolanic component to the cementitious mixture (concrete, mortar, grout, etc.) meeting the requirements of ASTM C-618; (b) it can be blended in the powder form at the manufacturing plant with white portland cement to produce a blended cement meeting the requirements of ASTM C-595 or C-1157; and (c) it can be interground with white portland cement clinker and the appropriate amount of gypsum for set control at the finish mill. (The white clinker can e.g. be of Type I, Type II, Type III, Type IV, or Type V ASTM C-50 cements) In these functions, the new white VCAS pozzolans compare favorably with supplementary cementing materials such as fly ash, blast furnace slag, condensed silica fume, and metakaolin that are routinely sold into the cement and concrete additives markets. When blended with a portland cement, the white VCAS pozzolan will generally be present as 10 to 30% by weight of the total composition, with 10 to 30% weight being preferred. Those skilled in the art will also recognize that all of these applications for the white VCAS pozzolan are equally suited to grey portland cement, albeit without the advantage of light color. Accordingly there is no implied limitation of the use of the white pozzolan only in white cement systems. Where used in a blend with cement, conventional functional cement additives can also be present, such as accelerators, retarders, water-reducers/plasticizers, corrosion inhibitors, and pigments.

As a consequence of their fine particulate granulometry and a low surface absorptivity that provides low water demand, the VCAS pozzolans can markedly improve the compaction and cementing efficiency of cement and concrete mixtures in which it is used. As those skilled in the art will recognize, this has significant advantages for a designer of cement and concrete materials and products, because sufficient fluidity for placement can be achieved at a lower water content, and hence water-to-cement (w/c) ratio, thus allowing for either an increase in strength for a given cement factor, or a reduction in the cement content for a given strength. In addition, in common with other siliceous pozzolanic admixtures, the VCAS pozzolans react chemically in the cementitious matrix to consume excess calcium hydroxide, $Ca(OH)_2$, produced from the hydration of the tricalcium and dicalcium silicates ($C_3S$ and $C_2S$) in portland cement, converting it to calcium silicate hydrate (C—S—H) that functions as additional binding agent. The conversion of the calcium hydroxide to supplementary C—S—H binder serves to improve the long-term strength potential of cement and concrete products and materials, while at the same time improving their durability and service life towards deterioration in the presence of aggressive chemical media such as sulfate-containing soils and water.

As discussed above, the chemical composition of the raw materials used for the manufacture of white portland cement production is modified to achieve the light color, usually by reducing the iron and magnesium contents. As a result, white portland cements typically have higher tricalcium aluminate phase ($C_3A$) contents than grey portland cements, as is shown in Table 2 based on information provided by the Portland Cement Association.

TABLE 2

| | Type of Portland Cement | |
| --- | --- | --- |
| | White Type I | Grey Type I |
| Component, % | | |
| $SiO_2$ | 22.5 | 20.5 |
| $Al_2O_3$ | 4.5 | 5.4 |
| $Fe_2O_3$ | 0.4 | 2.6 |
| CaO | 66.3 | 63.9 |
| MgO | 1.0 | 2.1 |
| $SO_3$ | 2.8 | 3.0 |
| $Na_2O$ eq. | 0.17 | 0.61 |
| Loss on ignition | 1.7 | 1.4 |
| Potential Compounds, % | | |
| $C_3S$ | 60 | 54 |
| $C_2S$ | 19 | 18 |
| $C_3A$ | 11 | 10 |
| $C_4AF$ | 1 | 8 |

It is well known that it is the $C_3A$ content of a portland cement that is a measure of its susceptibility to attack by sulfate. Therefore, the higher content of this compound in white cement ($C_3A$=11–12%) means that it will be more susceptible to this form of deleterious chemical attack than common Type I grey cement ($C_3A$=8–10%). Historically, this chemical susceptibility has been one of the weaknesses of white portland cement that has limited its further growth into the market place, for example into areas where there is significant sulfate content in soils or in areas close to the ocean. While it is common practice to use pozzolanic admixtures such as fly ash, silica fume or blast-furnace slag to improve the durability of grey portland cement to deleterious chemical attack, these pozzolanic materials all impart a dark coloration to the cement matrix and are therefore unsuitable for use where a white color is required architecturally. Therefore, the availability of a white pozzolan is highly desirable for the production of more durable pozzolanic white cements.

DESCRIPTION OF PREFERRED EMBODIMENTS

According to the process aspect of this invention, glass fiber wastes are converted into high quality filler and pozzolan products, by a shredding long entangled strands of glass into short fibers, adjusting the moisture content of the short fibers, grinding the short fiber, and classifying the ground material to produce a uniform high quality product with precise control over the maximum particle size and particle size distribution.

The process of glass manufacturing entails melting a mixture of carefully selected oxides, then cooling the molten material to produce the desired size, shape, and characteristics (e.g., container glass, flat glass, optical glass, fiber glass, etc.). The carefully selected ingredients for glass manufacturing are typically based on specific formulations of three material types: i.e., glass formers, glass modifiers or fluxes, and stabilizers. Glass formers comprise the major components of glass and most commonly consist of silicon dioxide in the form of sand and aluminum oxide in the form of alumina. Boron oxide is another common glass former component found in some formulations. Glass modifiers or fluxes lower the melting temperature and alter the viscosity of the glass melt and consist primarily of alkaline earth metal and alkali metal oxides, typically derived from the raw materials calcium carbonate, sodium carbonate and potassium carbonate. Stabilizers are added to make the glass strong and resistant to water and chemical attack. Low alkali glass, such as many of the formulations typically used for the manufacture of high performance glass fiber, is specially formulated for resistance to high temperatures and corrosive substances, in addition to having high physical strength and flexibility.

The process of glass fiber forming involves feeding molten glass from a high temperature furnace through a series of bushings containing thousands of accurately dimensioned holes or tips. Fine individual filaments of glass with diameters typically in the range 20–60 microns are drawn mechanically downward from the bushing tips, cooled and brought together to form bundles or strands of glass fibers. In the process of forming glass fibers, a significant amount of wastage is generated, mostly in the form of irregular, entangled long strands and bundles, often with nodules from partial fusion. The waste strands and bundles can be many tens of feet in length and are in a form that is not conducive to easy handling and processing by conventional means. This waste material is typically cooled by water quenching and shipped to a landfill for disposal. According to this invention a large amount of this waste glass fiber material can be processed and converted into high performance industrial products.

Figure 1:
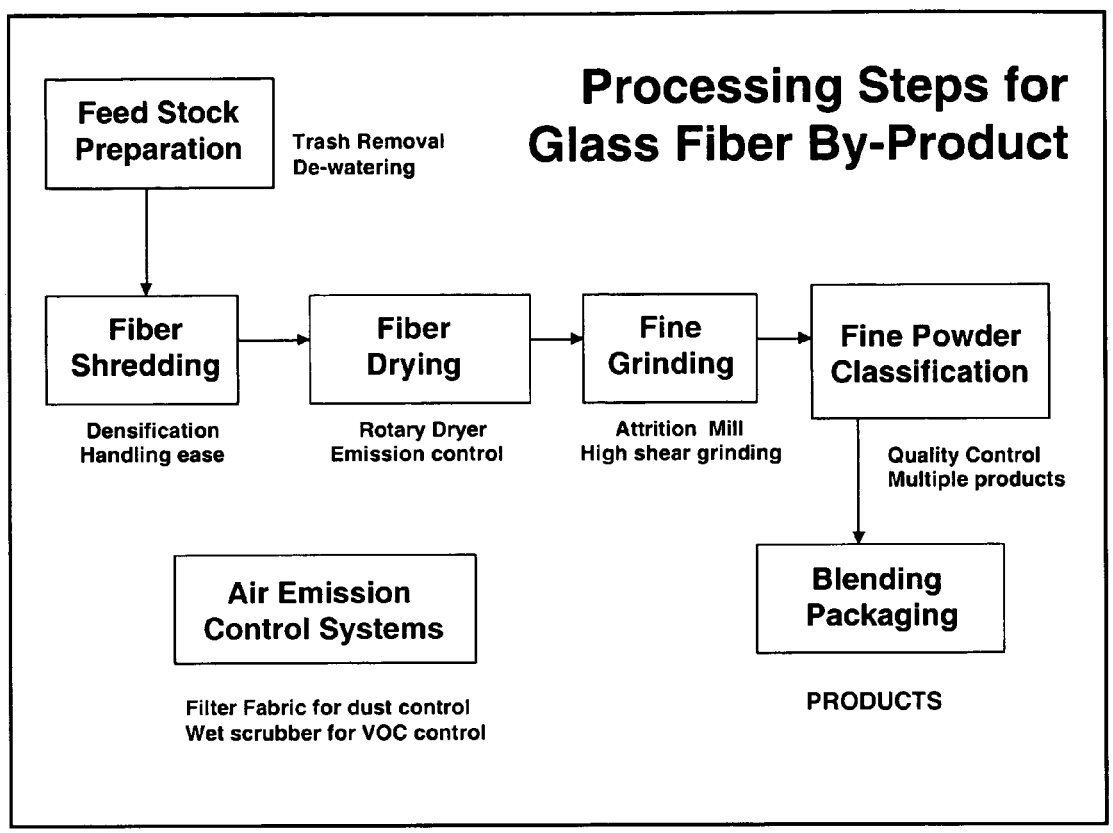
FIG. 1 is a schematic block diagram illustrating a process which may be used to prepare the white VCAS pozzolan of the present invention.

A typical process useful in the invention is shown schematically in FIG. 1. In the first step of the present process, the glass fiber waste (feed stock 12) is collected and placed in a containment area for de-watering and trash removal. Water used to cool the waste fiber stream is allowed to drain off the fibers and is collected and transferred to the wastewater treatment system. Incidental trash objects are manually removed from the bulk waste materials to allow for further processing.

In the second step of the process, the moist waste glass fiber bundles are processed by a shredder at fiber shredding through a shredder 14 to reduce the fiber length from infinitely long entangled strands to short fibers (typically less than 5 mm) for subsequent processing. The shredding stage consists of processing the entangled strands through a rapid rotating mandrel with protruding cutting knives. Stationary cutting edges are also located opposite the rotating mandrel. The fast cutting action of the knives snaps the entangled glass bundles and strands into the desired short individual fibers. A screen enclosure around the rotating mandrel is used to retain the large entangled strands and ensure shredding into short fibers.

In the third step of the process (fiber drying 16), the moisture content of the shredded short fibers is adjusted prior to further processing using dry and heated air. The moisture content is controlled to a predetermined specific range to optimize the subsequent grinding process. Generally the moisture content should be less than 10% by weight, and is preferably less than 2% by weight. In a very typical instance the moisture content is from 0.5 to 1.0% by weight.

In the fourth step of the process, the shredded short fibers are subjected to fine grinding 16 by being processed through an attrition mill, preferably in a vertical attrition mill such as a stirred or agitated ball mill. The short fibers and the ground glass are very abrasive materials. Abrasion of commonly used stirred mill components not only contaminates the product, it also reduces the grinding efficiency. In the present process the mill uses a rotation shaft and arms that agitate the grinding media and create both impact and shearing action, resulting in efficient product size reduction. The rotating arms are covered with replaceable leading-edge ceramic protectors composed of die cast and heat-fused alumina. The wall of the attrition mill is also lined with abrasion-resistant alumina to further minimize product contamination from the metal components in the mill. The mill uses the highest quality high alumina grinding media consisting of ⅛" to ⅜" diameter balls. The effectiveness and efficiency of the attrition mill are greatly enhanced by the die-cast, heat-fused leading edge protector attachments of the agitator arms. Energy inputs used in this grinding process are at least 100 kW-hrs/ton of feed fibers and typically are in the range of 100 to 200 kW-hrs/ton of the feed fibers.

The attrition mill is typically operated with continuous feed and discharge, although if desired it can alternatively be operated in a batch mode. The discharged grinding media and product are separated in stage five of this process using a vibratory screen with 80 to 100 mesh openings. The grinding media and oversize glass comminution products are returned to the attrition mill for continuous processing. The ground glass product passing the screen is conveyed to an air classification system for product refinement.

In step six of the invention (fine powder classification 18), the ground glass product is processed through a high-performance, dual-cyclone, dry air classification system. This stage is used to control the fineness and particle size distribution of the product from fine grind to low-micron range depending on the required specification. Particles larger than the maximum allowable are returned to the attrition mill for further grinding. The use of an air classification system in this stage allows for precise control over the maximum particle size and ensures the production of a uniform product. The air used in classification is vented through a filter fabric dust collector (Air emission control system 20). Ultra fine particles collected in the filter fabric can be blended with the final product (Blending Packaging 22).

The final classified white VCAS pozzolan product will generally have a particle size distribution such that at least 95% of the particles by weight have an equivalent spherical diameter (E.S.D.) of less than 45 μm (microns). Typically 95% by weight may be less than 25 μm; (typical median size around 9 μm); and for many applications the milling and classification will provide an end product where 95% by weight of the particles are of less than 10 μm E.S.D. (a typical median size here is around 3 μm); and in other instances the said end product can have P.S.D.'s where 95% of the particles by weight are less than 5μ, or even less than 3μ.

The finely ground white VCAS pozzolan product as produced by this process is characteristically of a blocky, almost equi-dimensional particle shape, with no evidence of residual high aspect ratio fibers. The aspect ratio of the particles will typically average less than 2:1, with the aspect ratio becoming smaller as the average particle size becomes smaller as a result of the milling and classification as discussed above. The finely ground powder product yielded by the invention can be packaged in bags or sold in bulk for industrial filler and concrete applications. This product can serve as a replacement to high priced white fillers and super pozzolans. The final product from the process contains substantially no particles which NIOSH defines as "respirable fibers," i.e., particles which are greater than 5 μm in length and less than 3 μm in diameter with an aspect ratio of greater than or equal to 5:1.

The invention is further illustrated by the following Examples, which are indeed to be considered exemplary of the invention, and not definitive thereof.

EXAMPLE 1

Preparation of White VCAS Pozzolans and Blended Pozzolanic Cements

To facilitate an evaluation of their potential pozzolanic properties, by-product glass fiber waste materials having compositions as shown in Table 1 were ground to fine powders with a variety of different particle size distributions or finenesses. This was carried out using both laboratory and pilot-scale equipment in a multi-stage process involving drying, comminution, screening, and high efficiency air classification, the object being to have no residual high aspect ratio particles (shards) in the powder products. Representative sub-samples of the ground VCAS product materials from this process were characterized for their granulometry properties, some illustrative examples of which are shown in Table 3.

TABLE 3

| Pozzolan ID | SSA ($m^2$/kg) | Median (μm) | D95 (μm) |
| --- | --- | --- | --- |
| GP1 | 269 | nd | 50 |
| GP2 | 560 | 12 | 30 |
| GP3 | 580 | 10 | 30 |
| GP4 | 686 | 9 | 25 |
| GP5 | 788 | 6 | 20 |
| GP6 | 956 | 3 | 10 |
| GP7 | >1200 | 1 | 3 |

The specific surface area (SSA) of the VCAS pozzolan powders was determined by the Blaine air permeability method according to ASTM C-204. The results in Table 3 show that the range of specific surface areas for the prepared VCAS pozzolan powders was 250 to greater than 1200 $m^2$/kg. The corresponding particle size distribution, median particle size, and D95 (particle size with 95% of the particles finer) of the products, were determined by the laser interferometer technique in aqueous dispersion using Microtrac® X100 or Coulter LS® particle size analyzers. The median particle sizes of the VCAS pozzolan products ranged from 1 μm (microns) to 12 μm, with corresponding D95 values ranging from 3 μm (microns) to 50 μm. The specific gravity of the VCAS powders, as determined by the Le Chatelier method (ASTM C-188), was 2.57 $cm^2$/g.

Examination of the VCAS powders at high magnification by scanning electron microscopy (SEM) confirmed that, as is typical of such ground materials, all the VCAS pozzolan samples were substantially blocky in particle shape. There was no sign of residual high aspect ratio particles. X-ray powder diffraction (XRD) analysis of the VCAS powders confirmed that that they were all essentially amorphous in structure.

Under the ASTM C-618 standard, based on the chemical composition ($SiO_2+Al_2O_3+FeO_3$), the VCAS pozzolans fall in the range of "Class N" pozzolans and at the low end of the range for "Class F" fly ashes. Applicable standards for the blended pozzolanic cements containing the VCAS pozzolans would include ASTM C-1157: Standard Performance Specification for Hydraulic Cement; and ASTM C-595: Standard Specification for Blended Hydraulic Cements.

The tri-stimulus color/brightness of the VCAS pozzolan powders compared with white portland cement (Federal White, Ontario) was determined according to ISO 2467, 2470, 2471 by the Technibrite TB-1C method, as follows: 100% WPC=75.5; GP6=84.2. Cement pastes prepared at w/c=0.4 with 100% white portland cement (WPC) and a 90:10 blend of white portland cement and VCAS pozzolan GP6 gave TB-1C values of 62.3 and 70.1, respectively. Thus, the VCAS pozzolans have a color/brightness that is somewhat whiter and brighter than white portland cement itself.

Blended pozzolanic cements were then prepared by intimately blending the ground VCAS pozzolan powders with commercial portland cement in various ratios in the range 10–30% by weight VCAS pozzolan replacing cement: namely, 90:10, 80:20, 70:30. The commercial portland cements used in these blends covered a range of alkali contents, including a low alkali (PC1), moderate alkali (PC2), and high alkali (PC3).

EXAMPLE 2

Pozzolanic Activity (Accelerated) of White VCAS Pozzolans

The pozzolanic performance of the various VCAS pozzolans from Example 1 were evaluated in portland cement mortars using the ASTM C-1240 method (Table 4). This method is an accelerated technique commonly used the evaluation of silica fume pozzolans and provides a "pozzolanic activity index" as a measure of the reactivity of the pozzolan. The method involves preparing test mortars to standard flow (100–115%) in which 10% by weight of the portland cement is replaced with the test pozzolan. The fresh mortar is cast into 2-inch cubes which are then allowed to cure, first for 24 hours at 100% relative humidity at 23° C., and then for 6 days in airtight container at 65° C., prior to measurement of compressive strength. The pozzolanic activity index of the pozzolan is then calculated as the ratio of the strength of the test mortar to the strength of a control (100% portland cement) mortar expressed as a percentage.

The test results collected in Table 4 show that mortars prepared with all of the VCAS pozzolans comfortably exceed the strength requirements of 85% of control as specified in ASTM C-1240. As is typical of other pozzolans, the pozzolanic reactivity of the VCAS pozzolans generally improve as the fineness increases. However, under the conditions of test, the finer grade pozzolans typically have a greater demand for water to reach standard flow. This results in a higher water to cement (w/c) ratio and somewhat lower strength potential. Tested under ASTM C-1240 protocols, the results for the VCAS pozzolans are comparable to or slightly better than silica fumes and metakaolins that have much high water demand to meet standard flow.

TABLE 4

| Sample ID | SSA ($m^2$/kg) | Mortar Strength (psi) | | Pozzolanic Activity Index (% Control) |
|---|---|---|---|---|
| | | Control PC | Test PC/GP | |
| 9010PC1/GP1 | 269 | 4,336 | 4,292 | 99 |
| 9010PC1/GP2 | 560 | 4,367 | 4,585 | 105 |

TABLE 4-continued

| Sample ID | SSA ($m^2$/kg) | Mortar Strength (psi) | | Pozzolanic Activity Index (% Control) |
|---|---|---|---|---|
| | | Control PC | Test PC/GP | |
| 9010PC1/GP3 | 580 | 4,365 | 4,988 | 114 |
| 9010PC2/GP4 | 686 | 5,046 | 5,127 | 102 |
| 9010PC2/GP5 | 788 | 5,046 | 5,455 | 108 |
| 9010PC1/GP6 | 956 | 4,485 | 4,640 | 103 |

EXAMPLE 3

Properties of Blended Portland-VCAS Pozzolan Cements

Further comparison of the performance of the blended portland pozzolanic cements prepared with the VCAS pozzolans described in Example 1 was conducted according to ASTM C-618: Standard Specification for Coal Fly Ash and Raw or Calcined Natural Pozzolan for Use as a Mineral Admixture in Concrete (Table 5). In this test method, test mortar were prepared according to ASTM C-109 protocols in which 20% by weight of the portland cement was replaced with the test pozzolan, with water added to produce a standard flow (110–115%). Water requirement for the test mortars was typically 95–98% of control, comfortably within the limit of 105% specified for F and C pozzolans and substantially less than the 115% specified for N pozzolans in ASTM C-618. The fresh mortar was then cast into 2-inch cubes and allowed to cure at 21° C. in limewater until time of test at 7, 14 or 28 days. The strength activity index of the pozzolan was then calculated as the ratio of the strength of the test mortar to the strength of a control (100% portland cement) mortar expressed as a percentage.

The test results collected in Table 5 show that 8020 blended cement mortars prepared with all of the white VCAS pozzolans comfortably exceed the strength requirements of 75% of control as specified in ASTM C-618. The 8020PC1/GP5 blended cement mortars markedly outperformed the control portland cement mortar (123% of control at 7 and 149% of control at 28 days); and the 8020PC1/GP6 blended cement mortar outperformed the control mortar at 28 days (115% of control). The white VCAS pozzolans exceed the performance of most high quality fly ashes and natural pozzolans. Other important characteristics of the cement systems, such as time of set or water requirement, where not adversely affected. It is significant to note that while these tests are conducted under conditions of standard flow, the higher surface area GP5 and GP6 pozzolans (788 and 956 $m^2$ kg) do not require the large amount of extra water that are common with other high surface area pozzolans such as silica fume and metakaolin.

TABLE 5

| Sample ID | SSA ($m^2$/kg) | Curing Age (Days) | Mortar Strength (psi) | | Strength Activity Index (% Control) |
|---|---|---|---|---|---|
| | | | Control PC | Test PC/GP | |
| 8020PC1/GP5 | 788 | 14 | 4,513 | 5,570 | 123 |
| | | 28 | 4,811 | 7,180 | 149 |
| 8020PC2/GP5 | 788 | 7 | 5,005 | 3,766 | 75 |
| | | 28 | 6,422 | 6,151 | 95 |
| 8020PC1/GP6 | 956 | 7 | 4,624 | 3,847 | 83 |
| | | 28 | 5,047 | 5,802 | 115 |

EXAMPLE 4

A further series of blended pozzolanic cement mortars was prepared according to the ASTM C-109 protocol in which 30% of the white VCAS test pozzolan replaced portland cement, rather than the 20% replacement prescribed in ASTM C-618 described above. The results of these tests (Table 6) show that even at the higher cement replacement level, the 7030PC1/GP6 blended cement still comfortably exceeded the ASTM C-618 requirement of 75% of control at curing ages of both 7 and 28 days. At a cure age of 28 days, the strength activity index of 7030PC1/GP6 blended cement mortar was 105%, showing that the blended cement outperformed the 100% cement control mortar. It is also noteworthy that, even with 10% less portland cement, the 7030PC1/GP6 blend had comparable performance to the 8020PC1/GP6 blend.

TABLE 6

| Sample ID | SSA ($m^2$/kg) | Curing Age (Days) | Mortar Strength (psi) Control PC | Mortar Strength (psi) Test PC/GP | Strength Activity Index (% Control) |
|---|---|---|---|---|---|
| 7030PC1/GP6 | 956 | 7 | 4,624 | 4,064 | 88 |
|  |  | 28 | 5,047 | 5,314 | 105 |

EXAMPLE 5

Improvement of Sulfate Resistance

The efficiency with which the white VCAS pozzolan of the invention reduces the expansion caused by attack by sulfate was tested according to the ASTM C-1012 method using mortar bars prepared with 20% by weight of the VCAS pozzolan substituting for white portland cement at w/c=0.485 and a flow of 95–105% of control.

Figure 2:
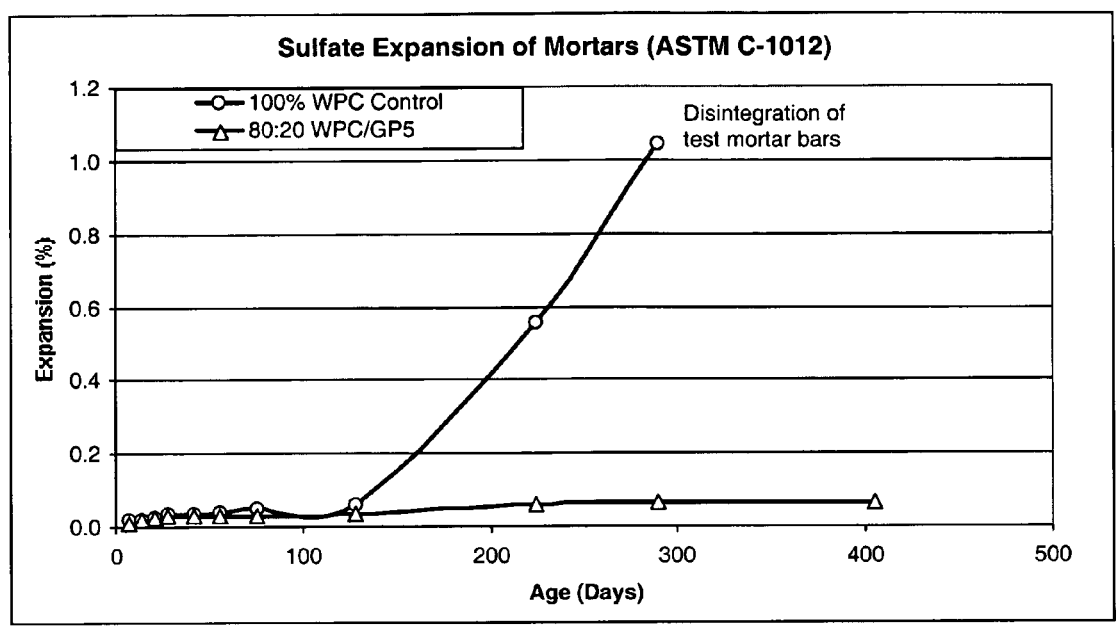
FIG. 2 is a graph showing expansion data for a blended cement prepared pursuant to the invention.

Illustrative expansion data for the GP5 pozzolan (SSA=788 $m^2$/kg) mortars are given in Table 7 and shown graphically in FIG. 2. It can be seen that significant expansion in the 100% white portland cement control mortar began at around 100 days and continued until the sample completely disintegrated before 290 days. By comparison, in the mortar with 20% GP5 VCAS pozzolan substituting for the white cement, very little expansion had occurred out to well over a year (405 days).

TABLE 7

| Exposure Age (Days) | Mortar Expansion 100% WPC Control | Mortar Expansion 80:20 WPC/GP5 |
|---|---|---|
| 7 | 0.0200 | 0.0100 |
| 28 | 0.0363 | 0.0238 |
| 56 | 0.0425 | 0.0295 |
| 128 | 0.0623 | 0.0335 |
| 224 | 0.5593 | 0.0608 |
| 290 | 1.0445 | 0.0632 |
| 405 | N/a* | 0.0640 |

*Sample disintegrated

These results for the blended white pozzolanic cement system may be compared favorably with those that can be achieved with a sulfate resisting ASTM C-150 Type V grey portland cement and/or blends of a Type I grey portland cement with colored pozzolans such the best quality fly ashes, blast-furnace slag, metakaolin or silica fume. This confirms that the white VCAS pozzolan can markedly improve the chemical durability of white portland cement, while still remaining the architecturally desirable white color.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A process for converting glass fiber wastes into high quality filler and pozzolan products, comprising shredding long entangled strands of low alkali and low iron content vitreous glass fibers, said fibers having by weight an alkali content of less than 2%, and an iron content of less than 0.8% and having little or no color, the fibers being shredded into short fibers of less than 5 mm; adjusting the moisture content of the short fibers; grinding the short moisture adjusted fibers in an attrition mill; and fine powder classifying the ground material through a high performance dual-cyclone, dry air classification system to produce a uniform high quality substantially white product having a reflectance value of at least 80 as measured by a Technibrite TB-1C colorimeter according to the ISO 2467, 2471 method, said classification being conducted with precise control over the maximum particle size and particle size distribution so that said product is characterized by a blocky, relatively equi-dimensional particle shape wherein the average aspect ratio of the particles is less than 2:1, and with substantially no residual high aspect ratio fibers, and a P.S.D. such that at least 95% by weight of the particles are of less than 45 microns E.S.D.

2. A method in accordance with claim 1, wherein said shredded and moisture adjusted short fibers are ground in a vertical attrition mill using an energy input of at least 100 kW/hrs/ton of said fibers.

3. A process in accordance with claim 1, wherein the moisture content of said shredded short fibers is adjusted to less than 10% by weight.

4. A process in accordance with claim 3, wherein the moisture content of said shredded short fibers is adjusted to less than 2% by weight.

5. A process in accordance with claim 3, wherein the moisture content of said shredded short fibers is adjusted to 0.5 to 1.0% by weight.

6. A process in accordance with claim 1, wherein said milling and classification is controlled so that the final product contains substantially no particles which are greater than 5 μm in length and less than 3 μm in diameter with an aspect ratio of greater than or equal to 5:1, whereby said product is substantially free of respirable particles.

* * * * *